United States Patent
Prakash et al.

(10) Patent No.: US 10,001,906 B2
(45) Date of Patent: Jun. 19, 2018

(54) APPARATUS AND METHOD FOR PROVIDING A VISUAL INDICATION OF AN OPERATION

(75) Inventors: Priya Prakash, London (GB); Joe Phillips, London (GB); Ian Moreira de Andrade Silva, Recife (BR)

(73) Assignee: Nokia Technologies Oy, Espoo (FI)

( * ) Notice: Subject to any disclaimer, the term of this patent is extended or adjusted under 35 U.S.C. 154(b) by 1572 days.

(21) Appl. No.: 13/366,840

(22) Filed: Feb. 6, 2012

(65) Prior Publication Data
US 2013/0201092 A1  Aug. 8, 2013

(51) Int. Cl.
| | |
|---|---|
| G09G 1/00 | (2006.01) |
| G06F 3/0483 | (2013.01) |
| G06F 3/0488 | (2013.01) |
| G06F 3/0485 | (2013.01) |
| G06F 3/0486 | (2013.01) |

(52) U.S. Cl.
CPC ........ *G06F 3/0483* (2013.01); *G06F 3/04883* (2013.01); *G06F 3/0485* (2013.01); *G06F 3/0486* (2013.01)

(58) Field of Classification Search
CPC ...... G09G 5/00; G02B 27/017; G06F 3/0304; G06F 3/033; G06F 3/017; G06F 3/0484
See application file for complete search history.

(56) References Cited

U.S. PATENT DOCUMENTS

| | | | |
|---|---|---|---|
| 8,587,528 B2 * | 11/2013 | Chaudhri | 345/173 |
| 2010/0251112 A1 * | 9/2010 | Hinckley et al. | 715/702 |

OTHER PUBLICATIONS

International Search Report and Written Opinion for Application No. PCT/FI2013/050059 dated May 7, 2013.
Willie D: *Android HTC EVO 4G Tutorials 01—Getting Started, Home Screens*, [online] [retrieved Apr. 23, 2013]. Retrieved from the Internet: URL:http://www.youtube.com/watch?v=fwvt-rsCMA8 (dated Feb. 3, 2011) 1 page.
igreekiphone: Greek-iPhone.com: *Barrel—Flippy mode (Cydia)*, [online] [retrieved Apr. 23, 2013]. Retrieved from the Internet: URL:http://www.youtube.com/watch?v=DH9X11_XhME (dated Mar. 25, 2011) 1 page.
FlipdooPublisher: *Screencast by @flipdoo from* Screenr.com, [online] [retrieved Apr. 23, 2013]. Retrieved from the Internet: URL:http://www.youtube.com/watch?v=858710WhNrY (dated Sep. 6, 2010) 1 page.

* cited by examiner

*Primary Examiner* — Michael Faragalla
(74) *Attorney, Agent, or Firm* — Alston & Bird LLP

(57) ABSTRACT

An apparatus, method, and computer program product are described that provide for a visual indication of an operation to be performed, such that a user, upon applying a first portion of a user input, may be able to determine from the visual indication whether the input applied, when completed, will cause the desired operation to be performed. The apparatus may provide for the display of a screen having a representation of interactive content, and an input may be received from the user that includes a contact component and a movement component, such as a stroke gesture. In response to receipt of the contact component and prior to receipt of the movement component, the apparatus may provide for a visual indication of an operation to be performed. The operation may be executed based on receipt of at least a portion of the movement component.

18 Claims, 14 Drawing Sheets

APPARATUS AND METHOD FOR PROVIDING A VISUAL INDICATION OF AN OPERATION

TECHNOLOGICAL FIELD

Embodiments of the present invention relate generally to providing a visual indication, on a display of a device, of an operation to be executed prior to the execution of the operation.

BACKGROUND

Advancements in mobile device technology have provided mobile devices, such as cellular telephones and portable digital assistants (PDAs), that have increased functionality and allow users greater access and control of information. Users may access a number of screens displaying information, may navigate between screens, and may manipulate the information presented on the screens to arrange the information in a way that suits the user's preferences. Moreover, some of the screens accessed by the user may comprise information associated with one or more programs that may or may not be in execution. For example, some programs may be running, while other programs may be dormant, but may be invoked upon user interaction with a representation of the program (such as an icon).

To enable users full and easy access to the wide range of functionality offered by modern mobile devices, such devices may be configured to accept several types of user inputs and to provide for the execution of different operations based on various aspects of the user inputs received.

Accordingly, it may be desirable to provide an improved mechanism for conveying to the user which operation is to be executed prior to the actual execution of the operation to allow the user to verify that the appropriate user input has been provided for causing the desired operation.

BRIEF SUMMARY OF EXAMPLE EMBODIMENTS

Accordingly, embodiments of an apparatus, method, and computer program product are described that can provide for a visual indication of the operation to be executed in response to the receipt of a portion of the user input. In particular, embodiments of an apparatus for providing for a visual indication of an operation may include at least one processor and at least one memory including computer program code. The at least one memory and the computer program code may be configured to, with the processor, cause the apparatus to provide for display of a screen comprising at least one representation of an interactive content; receive an input from a user comprising a contact component and a movement component; and, in response to receipt of the contact component and prior to receipt of the movement component, provide for a visual indication of an operation to be performed. The operation may be determined based on at least a position of the contact component. The apparatus may further be caused to provide for execution of the operation based on receipt of at least a portion of the movement component.

In some cases, the visual indication may comprise a graphical effect applied to at least a portion of the screen proximate the position of the contact component. The graphical effect may simulate a physical response of the screen to the input based on at least the position of the contact component of the input. The graphical effect may, for example, simulate a deflection of the screen away from a source of the input, or the graphical effect may simulate a deflection of a portion of the screen corresponding to the position of the contact component of the input away from a source of the input.

The screen may, in some embodiments, be a first screen and the interactive content may be a first interactive content. The operation may comprise a visual transition from the first screen to a second screen comprising at least one representation of a second interactive content in response to the position of the contact component being an edge portion of the first screen. In other embodiments, the operation may comprise translation of at least a portion of the interactive content proximate the position of the contact component, wherein the translation is proportional to the movement component of the input.

In other embodiments, a method and a computer program product are described for providing for visual indication of an operation by providing for display of a screen comprising at least one representation of an interactive content; receiving an input from a user comprising a contact component and a movement component; and, in response to receipt of the contact component and prior to receipt of the movement component, providing for a visual indication of an operation to be performed. The operation may be determined based on at least a position of the contact component. Embodiments of the method and computer program product may further provide for execution of the operation based on receipt of at least a portion of the movement component.

In some cases, the visual indication may comprise a graphical effect applied to at least a portion of the screen proximate the position of the contact component. The graphical effect may simulate a physical response of the screen to the input based on at least the position of the contact component of the input. The graphical effect may simulate a deflection of the screen away from a source of the input, or the graphical effect may simulate a deflection of a portion of the screen corresponding to the position of the contact component of the input away from a source of the input.

The screen may be a first screen and the interactive content may be a first interactive content. The operation may comprise a visual transition from the first screen to a second screen comprising at least one representation of a second interactive content in response to the position of the contact component being an edge portion of the first screen. Alternatively, the operation may comprise translation of at least a portion of the interactive content proximate the position of the contact component, where the translation is proportional to the movement component of the input.

In still other embodiments, an apparatus is described for providing for visual indication of an operation. The apparatus includes means for providing for display of a screen comprising at least one representation of an interactive content; means for receiving an input from a user comprising a contact component and a movement component; means for providing for a visual indication of an operation to be performed, in response to receipt of the contact component and prior to receipt of the movement component; and means for providing for execution of the operation based on receipt of at least a portion of the movement component. The operation may be determined based on at least a position of the contact component.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
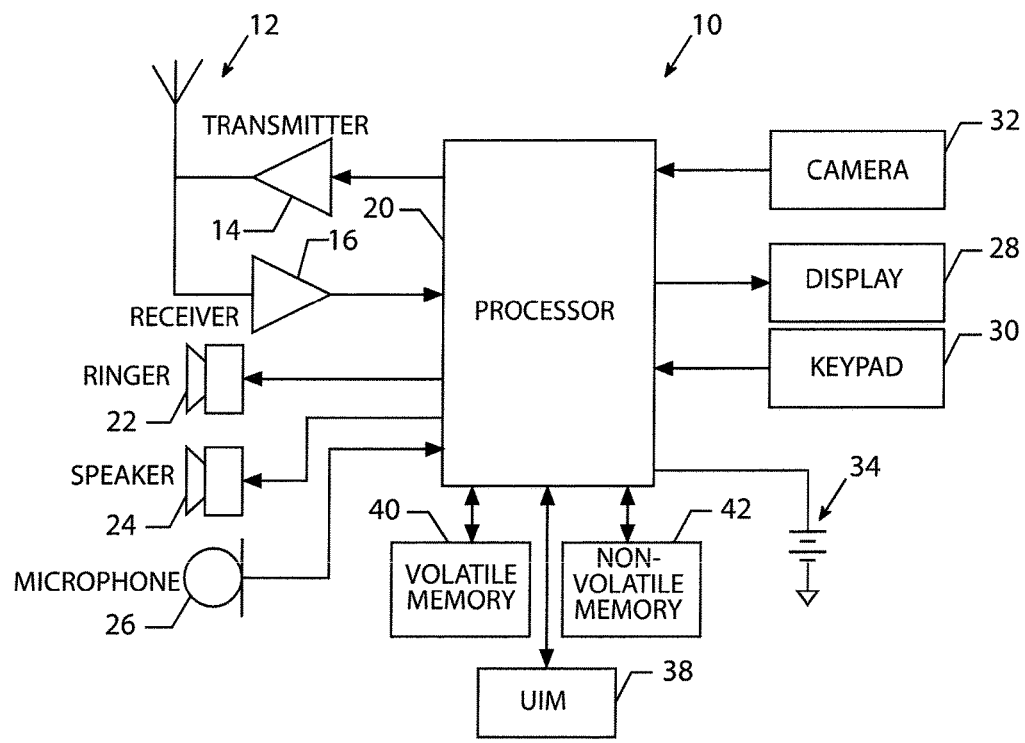
FIG. 1 illustrates one example of a communication system according to an example embodiment of the present invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, mobile terminals, including devices such as portable digital assistants (PDAs) and cellular telephones, are being designed with greater functionality for executing a large number of different operations. As a result, such devices are typically configured to accept a wide array of user inputs for causing the execution of the different operations. For example, and as described in greater detail below, in a device having a touch screen display a touch gesture may be provided as the user input, and the touch gesture may have various components, such as a contact component, a movement component, a force component, etc. Based on the different components of the user input, the device may determine that execution of a particular operation is requested. For example, a stroke gesture (which may include a contact component and a movement component) received at one location on the touch screen display may cause the execution of one operation, whereas the same stroke gesture received at another location may cause the execution of a different operation.

In some cases, the smaller size of some devices, which allows for greater portability to the user, may make it difficult for the user to discern whether the user input was applied in the correct location or in the appropriate manner to bring about the execution of the desired operation. For example, a user may have intended to apply a stroke gesture to an edge of the displayed screen to transition from one screen (such as a lock screen) to another screen (such as a home screen); however, the user input may be inadvertently applied to an area close to the edge of the screen, but not quite close enough to be considered at the edge, and as a result a different operation (such as a panning of the screen) may result. The user may not realize that the wrong user input was applied until after execution of the panning operation when the user was expecting a screen transition operation, at which point, the user will have to spend time undoing the wrong operation, if possible, and re-applying the input.

Accordingly, embodiments of the present invention provide for a visual indication of the operation to be executed in response to the receipt of a portion of the user input, such that the user can determine whether the correct user input was applied in the correct manner to bring about the execution of the desired operation (i.e., before the operation is actually executed), as explained in greater detail below.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include a proximity component and/or an orientation component, as described below. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing for a visual indication of an operation to be performed is shown. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
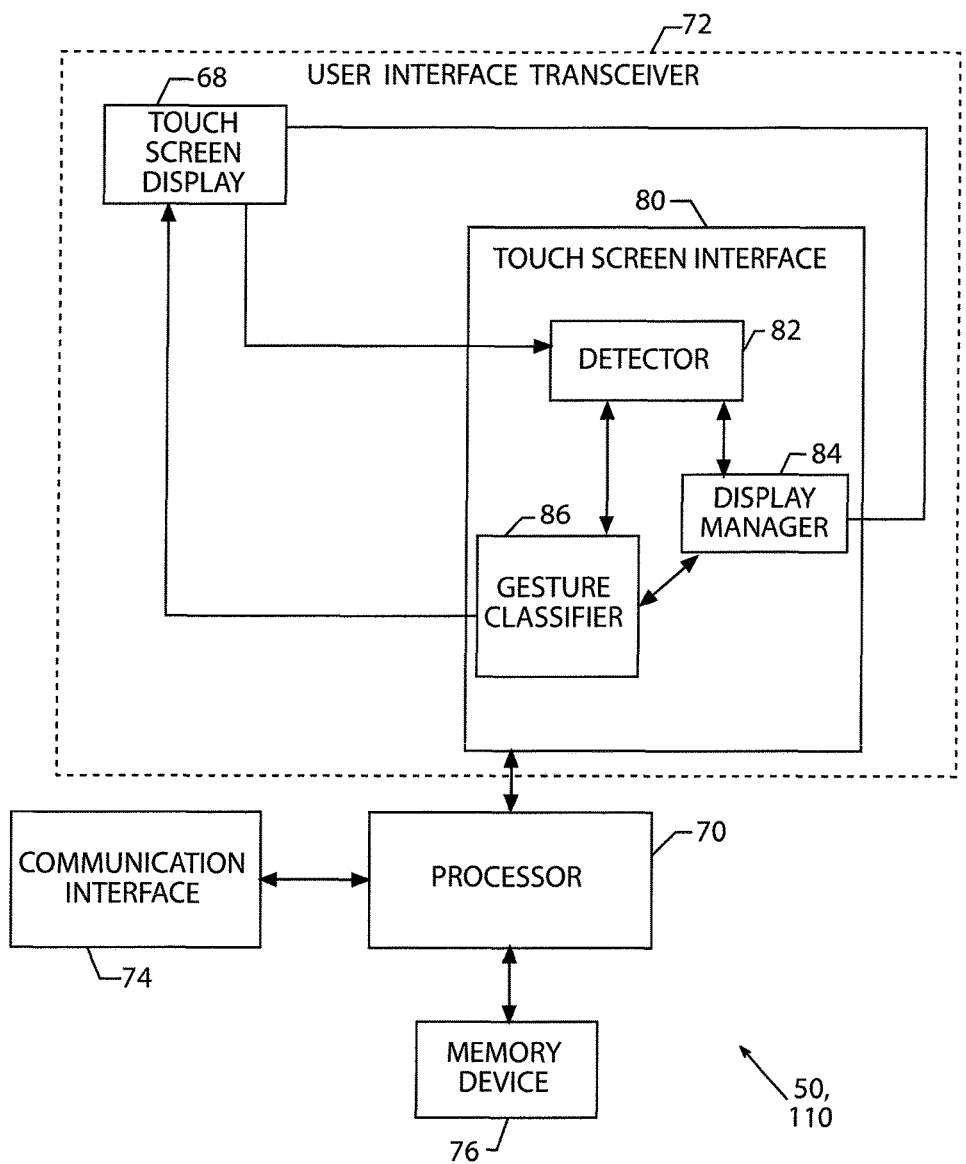
FIG. 2 illustrates a schematic block diagram of an apparatus for of providing for a visual indication of an operation to be performed according to an example embodiment of the present invention.

It should also be noted that while FIG. 2 illustrates one example of a configuration of an apparatus for providing for a visual indication of an operation to be performed, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for providing for a visual indication of an operation to be performed may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

Figure 3:
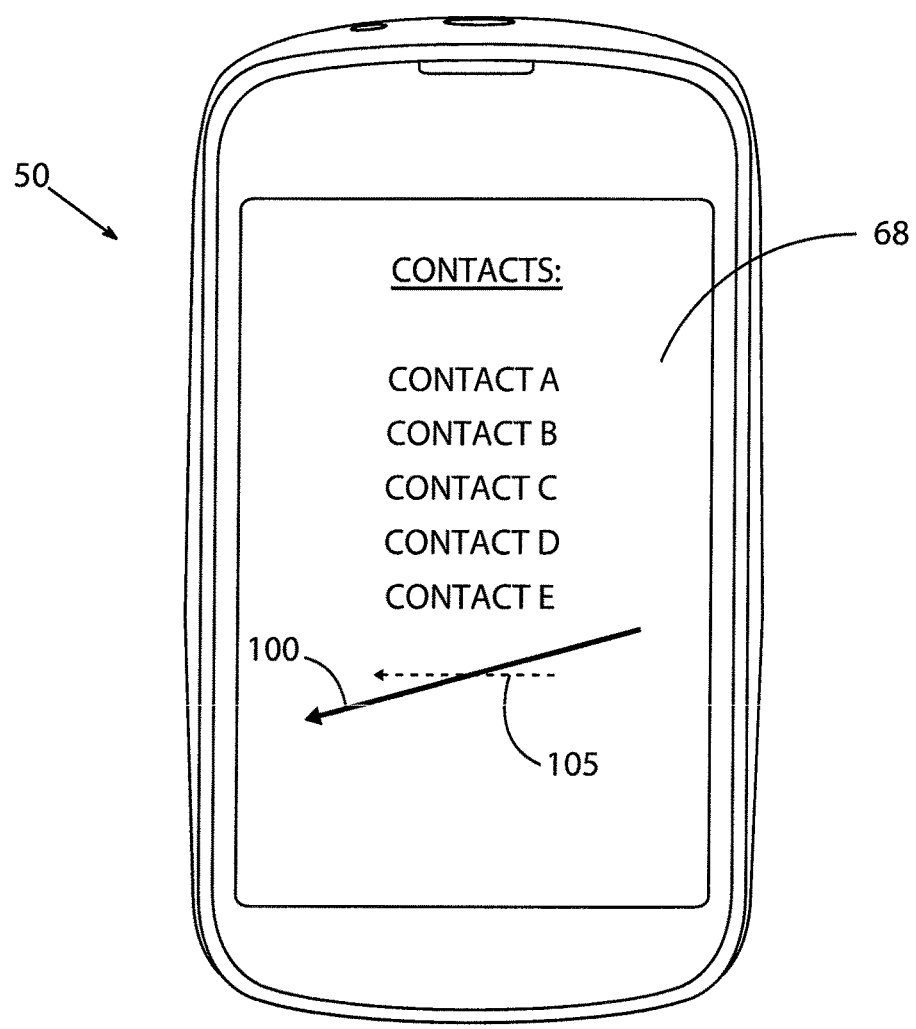
FIG. 3 illustrates a stroke gesture including a contact component and a movement component according to an example embodiment of the present invention.

A touch may be defined as a touch event that impacts a single area (without or with minimal movement on the surface of the touch screen display 68) and then is removed. A multi-touch may be defined as multiple touch events sensed concurrently (or nearly concurrently). A stroke may be defined as a touch event followed immediately by motion of the object initiating the touch event while the object remains in contact with the touch screen display 68. In other words, the stroke may be defined by motion following a touch event thereby forming a continuous, moving touch event defining a moving series of instantaneous touch positions (e.g., as a drag operation or as a flick operation). As such, a stroke 100 (shown in FIG. 3) may include a contact component A (e.g., initial contact with the touch screen display 68) and a movement component (e.g., motion of the object contacting the touch screen display while the object remains in contact, represented by the arrow 100), with the direction of the movement component being the direction of motion of the object across the touch screen display. In some cases, the direction may be a nominal direction that is not identical to the direction of the movement component (e.g., a direction that is not the actual or instantaneous direction of the movement of the object across the touch screen display 68), as shown in FIG. 3 via the dashed arrow 105. Multiple strokes and/or touches may be used to define a particular shape or sequence of shapes to define a character or symbol.

A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Turning now to FIGS. 4A-4F, in general, an apparatus 50 is provided, such as an apparatus embodied by the mobile terminal 10 of FIG. 1 (e.g., a cellular phone) that has or is otherwise associated with a touch screen display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to at least provide for display of a screen 200 comprising at least one representation of an interactive content. The screen 200 may, for example, represent an interactive content such as a home screen, a lock screen, or a screen associated with a particular program, such as a telephone program. The apparatus may be further caused to receive an input from a user comprising a contact component and a movement component, such as a stroke 100 (FIG. 3).

Although the embodiments depicted in the figures and used in the examples herein refer to a touch screen display 68 configured to receive touch inputs, the inputs may be provided to a non-touch display and/or via non-touch user input devices, such as a keypad or mouse. In this regard, the position of the non-touch input may refer to the location on the non-touch display corresponding to the location the input is applied (e.g., the position of an indicator, such as a mouse pointer), and the movement component of the input may be the motion of the indicator on the non-touch display, which, for example, is the result of a corresponding motion of a mouse on a horizontal surface, with the direction of the movement component being the direction of motion of the indicator across the non-touch display.

Figure 4A:
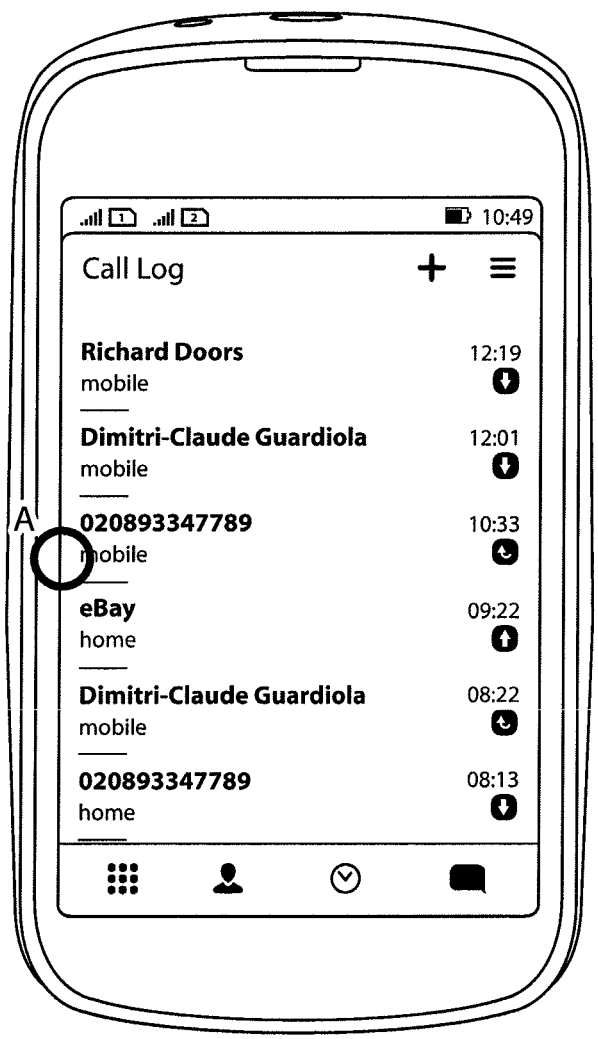
FIGS. 4A-4F illustrate a transition operation from a first screen to a second screen according to an example embodiment of the present invention.
Figure 4B:
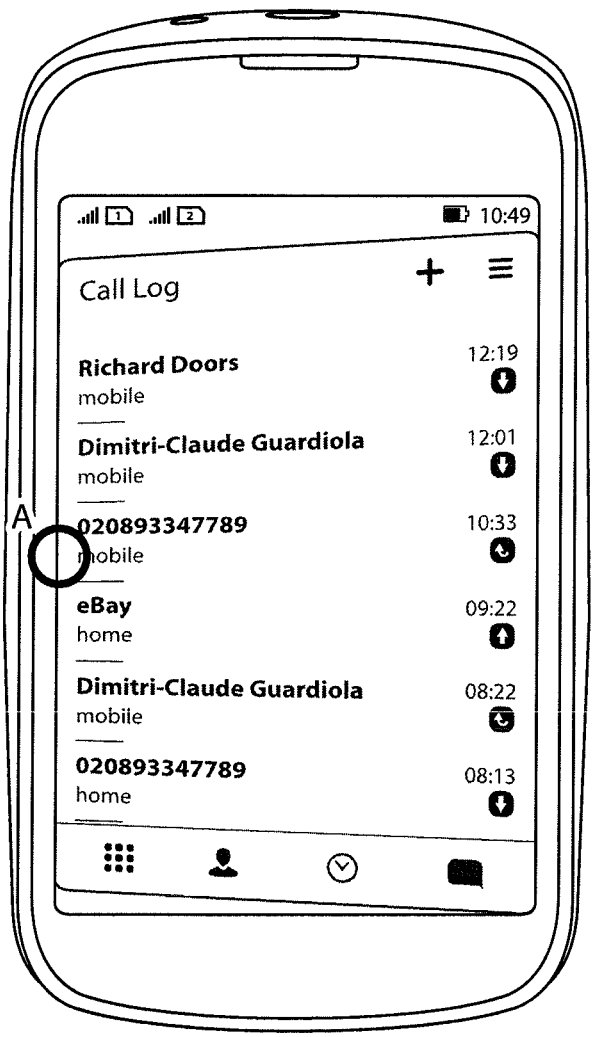
Figure 4C:
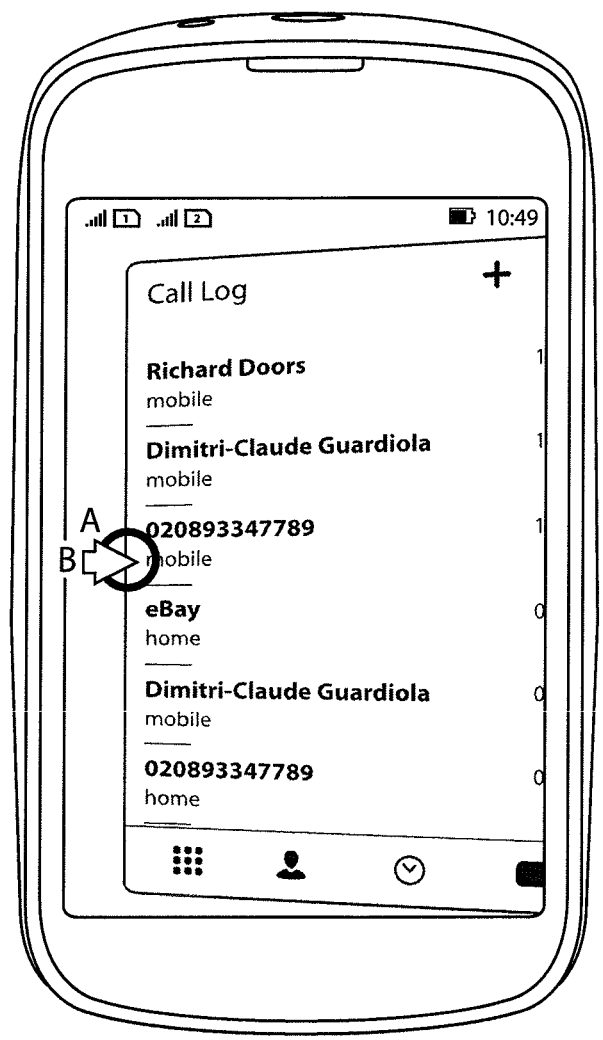
Figure 4D:
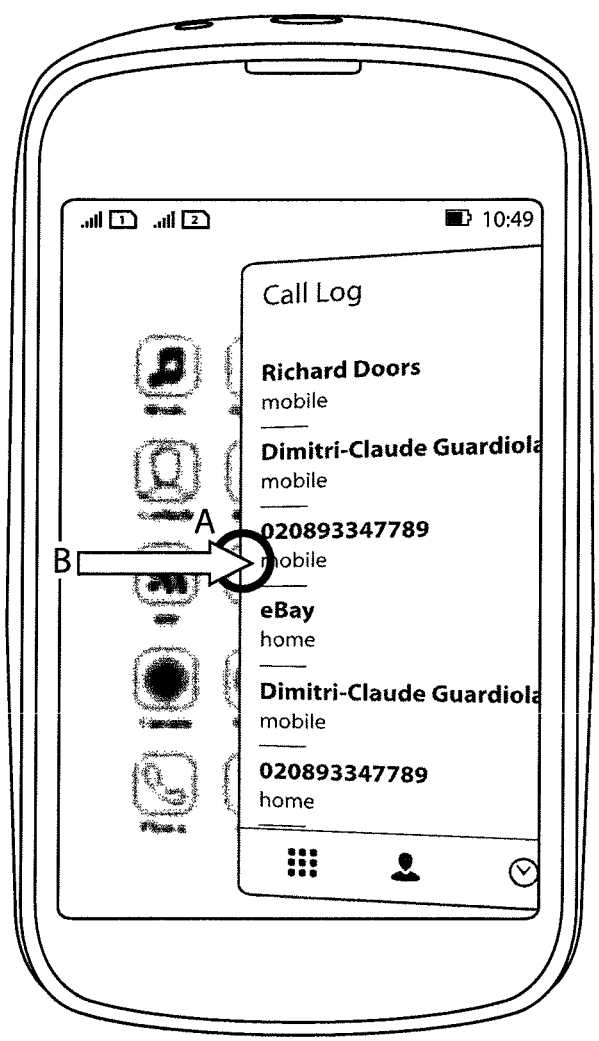
Figure 4E:
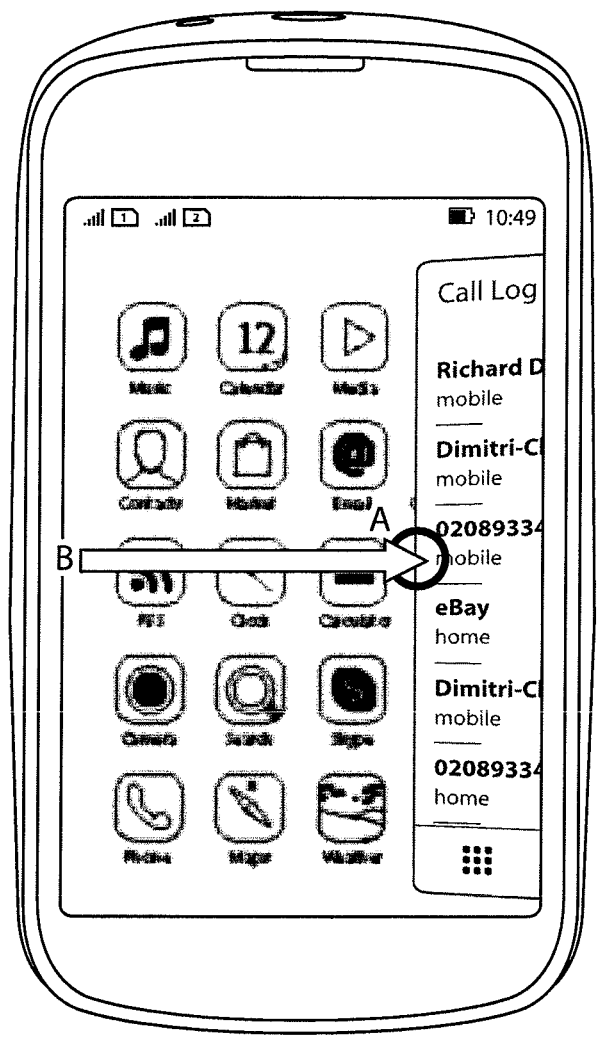
Figure 4F:
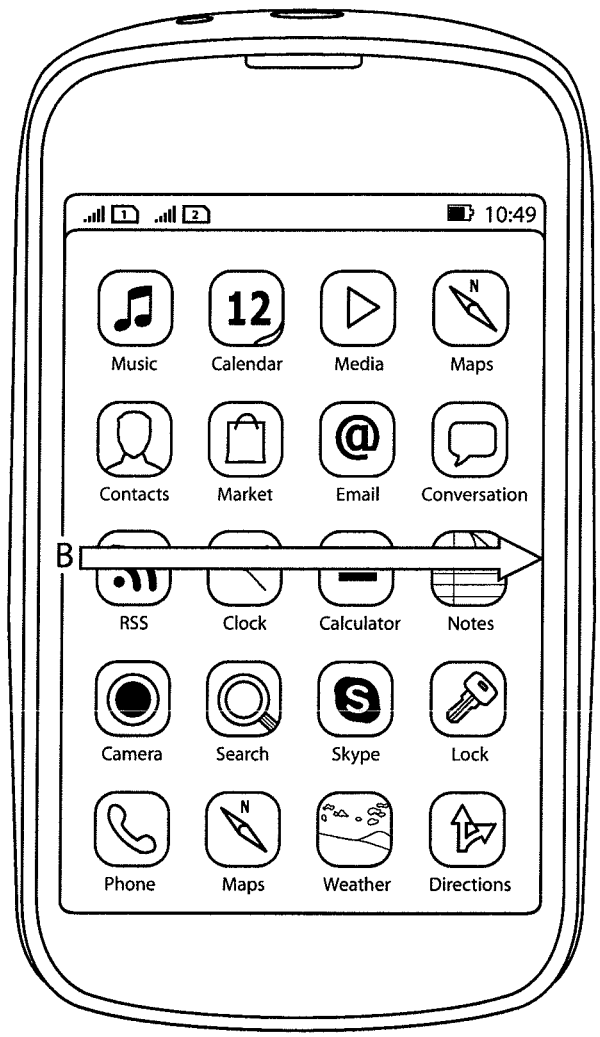

In response to receipt of the contact component A (illustrated in the figures by a circle representing the area of contact of the user's finger with the touch screen display 68, for example) and prior to receipt of the movement component B (shown in FIGS. 4C-4F as an arrow that grows progressively longer as more of the stroke is applied), a visual indication of an operation to be performed may be provided for. One example of such a visual indication is illustrated in FIG. 4B and described below. The apparatus may then be caused to provide for execution of the operation based on receipt of at least a portion of the movement component B (FIGS. 4C-4F).

Figure 5:
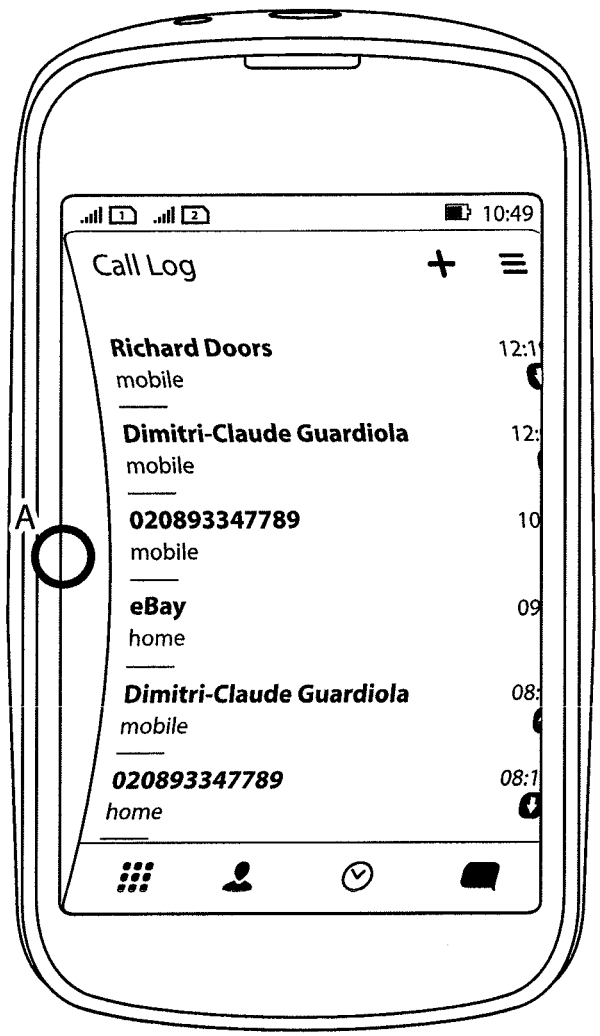
FIG. 5 illustrates a visual indication of a screen transition according to another example embodiment of the present invention.

For example, the visual indication may comprise a graphical effect that is applied to at least a portion of the screen proximate the position of the contact component. In FIG. 4B, one embodiment is illustrated in which the graphical effect simulates a physical response of the screen to the input based on at least the position of the contact component of the input. For example, the graphical effect may simulate a deflection of the screen away from a source of the input. In other words, as shown in FIG. 4B, the screen or at least a portion of the screen near the location of the user's initial contact (the position of the contact component A in FIG. 4B) may appear to move away from the user's finger and into the screen. This type of graphical effect may simulate, for example, the response of a physical object to the application of a force, such as a user's interaction with a card (e.g., a playing card from a deck of cards) or a page out of a book as the user applies pressure to a portion of the physical object and causes it to move away from him. Alternatively, as shown in FIG. 5, the graphical effect may simulate a deflection of a portion of the screen (e.g., rather than the whole screen) corresponding to the position of the contact component A of the input away from a source of the input.

Moreover, in some embodiments, the scope of the visual indication (e.g., whether the graphical effect is applied to the entire screen or a portion of the screen) may itself provide a indication of the operation to be executed. For example, a visual indication that is applied to only a portion of the screen (such as shown in FIG. 5) may indicate to the user that the operation to be executed will only affect a portion of the screen that is displayed (such as the movement or shifting of one of the displayed content elements, for example, an icon). A visual indication that is applied to the entire screen (such as shown in FIG. 4B) may indicate to the user that the operation to be executed will affect the entire screen (such as the transition from the displayed screen to another screen, as shown in FIGS. 4A-4F). The visual indication may thus, as described above, allow the user to more readily remember the operation being indicated so that the visual indication will have meaning to the user and will help the user confirm that the appropriate input was provided to bring about the desired operation.

Figure 6A:
FIGS. 6A-6C illustrate a panning operation of a screen according to an example embodiment of the present invention.
Figure 6B:
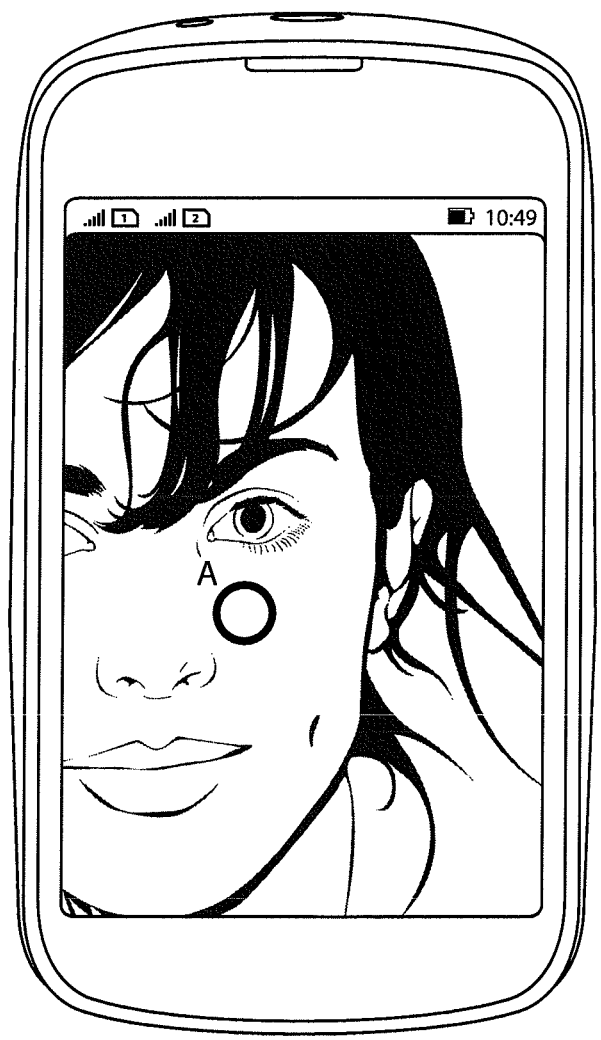
Figure 6C:

In some cases, the operation may be determined based on at least a position of the contact component A. Thus, a user input, such as a stroke, applied from a leftmost edge 215 of the screen towards the rightmost edge 220 (as shown in FIGS. 4A-4F) may invoke the execution of a screen transition operation, whereas the same stroke 100 applied from a point near the leftmost edge (but not at the leftmost edge) towards the rightmost edge (as shown in FIGS. 6A-6C) may invoke a different operation, such as a panning operation where the contents of the screen are simply shifted in a direction corresponding to the direction of the movement component of the stroke. Thus, in applying the user input at the leftmost edge 215 (FIGS. 4A-4F), the user may transition from one screen of interactive content to another screen representing different interactive content, whereas in applying the user input somewhere inside (spaced from) the edge (FIG. 6A), the user may pan the contents of the screen, so as to view content that was previously outside the viewing area.

In this regard, in some embodiments, the screen may be a first screen and the interactive content may be a first interactive content. For example, as depicted in FIG. 4A, the first screen 220 may be a call log that lists phone numbers for recent calls made and/or received by the user. The operation may comprise a visual transition from the first screen 200 (the call log in this example) to a second screen 230 (such as a home screen, shown in FIG. 4F) comprising at least one representation of a second interactive content in response to the position of the contact component being an edge portion of the first screen (such as the leftmost edge 215 depicted in FIG. 4A). Thus, in this example, in response to receipt of the input at the leftmost edge 215 (FIG. 4A), a visual indication is provided (FIG. 4B) that indicates to the user that a screen transition operation is to be performed when the user proceeds with the movement component of the input. In this way, if the user had intended to invoke some other operation, such as a panning operation, but inadvertently applied the touch input to the leftmost edge 215, the user may discontinue the input (e.g., by not proceeding with the movement component of the input and removing his finger from the touch screen display) and may reapply the input in the appropriate position on the touch screen display to invoke the desired operation. In other words, the provision of a visual indication of the operation to be executed provides the user with an opportunity to either confirm that the operation to be executed is the desired operation or to discontinue the input and re-apply the input in the appropriate manner to bring about the desired operation. Such an indication in advance of the actual execution of the operation saves the user time and allows for a less frustrating and more efficient experience with the user interface, as the user does not have to endure unnecessary and unintended operations and then have to deal with how to reverse the executed unintended operation.

In still other embodiments, the operation may comprise the translation of at least a portion of the interactive content proximate the position of the contact component. Thus, as the user applies a stroke gesture to the touch screen display, the screen 200 may be translated at a speed and/or a direction that is proportional to the speed and/or direction at which the input was applied by the user. Moreover, the user may, in some cases, reverse the visual transition by reversing the direction of the stroke gesture if the stroke gesture has not yet been completed (e.g., the user's finger is still contacting the touch screen display). Thus, the translation (and/or rotation) of the screen 200 may likewise be reversed, moving the screen back to its original position with respect to the viewing area, at a speed and/or in a direction that is proportional to the speed and/or direction of the reverse stroke gesture. In other cases, however, the translation of the interactive content may be automatic upon receipt of at least a portion of the stroke gesture (e.g., may not be controllable by the user), such that the stroke gesture in this example could not be reversed once initiated.

In FIGS. 6A-6C, for example, the whole screen 200 is panned as the movement component B is applied. Thus, as the user's finger moves across the touch screen display 68, the screen 200 also moves at a speed and/or in a direction corresponding to the speed and/or direction that the user's finger is moving. In FIG. 6B, the visual indication is a dimming of the screen 200, which indicates to the user that a panning operation is to be performed. As noted above, the visual indication may in some cases be a graphical effect, such as a deflection of the screen or a portion of the screen towards or away from the source of the input (e.g., the user's finger), a wrinkling, warping, or "ripples in a pond" effect of the screen around the position of the contact component, a "shaking" effect of the screen, a change in coloring (e.g., color gradient), brightness, or opacity of the screen or a portion of the screen, or various other types of visual effects applied to the entire screen or only a portion of the screen proximate the position of the contact component that the user may associate with the operation to be performed.

As noted above and described through the examples, in some cases each screen may represent an interactive content. As used herein, the term "interactive content" refers to information presented to the user via the display 68 (FIG. 2) or the display 28 (FIG. 1), either graphical (such as using icons, photos, illustrations, etc.) or textual, with which the user may interact in a particular way for a particular purpose. For example, as shown in the example depicted in FIG. 4A, a first interactive content may include information that is presented to the user as part of a call log, such as the names and numbers of people the user has called recently or from whom the user has received calls. The first interactive content may be configured such that the user can only interact with the content in a certain manner, such as by selecting one of the displayed entries to call the person or to display full contact details for the person. Thus, the purpose of the first interactive content may be to provide certain information to the user (e.g., providing names and numbers to the user) and to allow the user to access certain features of a phone program.

Continuing this example, a second interactive content (shown in FIG. 4F, for example) may be a home screen that displays data such as a list of icons representing programs available on the device for access by the user. The second interactive content may be configured such that the user can select an icon to launch a program, re-order the icons, display details regarding one or more of the icons, etc.

Accordingly, in some cases, the first interactive content may comprise different information than the second interactive content. Alternatively or additionally, the first interactive content may be configured to allow the user to interact with the first interactive content according to a first set of rules, and the second interactive content may be configured to allow the user to interact with the second interactive content according to a second set of rules.

As described above and depicted in the figures, the particular arrangement and presentation of interactive content (whether the same or different interactive content) is described herein as being provided via "screens" that are displayed to the user upon the display 68 of the apparatus. In other words, each screen presents to the user a collection of content elements that make up the respective interactive content. In FIG. 4A, for example, each entry in the call log is a content element of the first screen 200 and is part of the first interactive content. In some cases, a screen may be displayed to the user via the entire viewing area (e.g., across the entire touch screen display), whereas in other cases a "virtual" viewing area may be provided, such as a window that is used to display a screen over only a portion of the viewing area. In such cases, more than one screen may be displayed to the user over the entire viewing area, and each screen may be configured to respond to user inputs as described above.

Although examples of operations described above include screen transitions and panning of screens and screen content, various other types of operations may be invoked for execution based on the type of input applied and the interactive content presented on the screen to which the input is applied, among other factors. For example, in some cases, data may be transferred from one device to another device in proximity to the user's device by touching a representation of the data to be transferred on the touch screen display and moving the representation in the direction of the physical location of the device.

Figure 7:
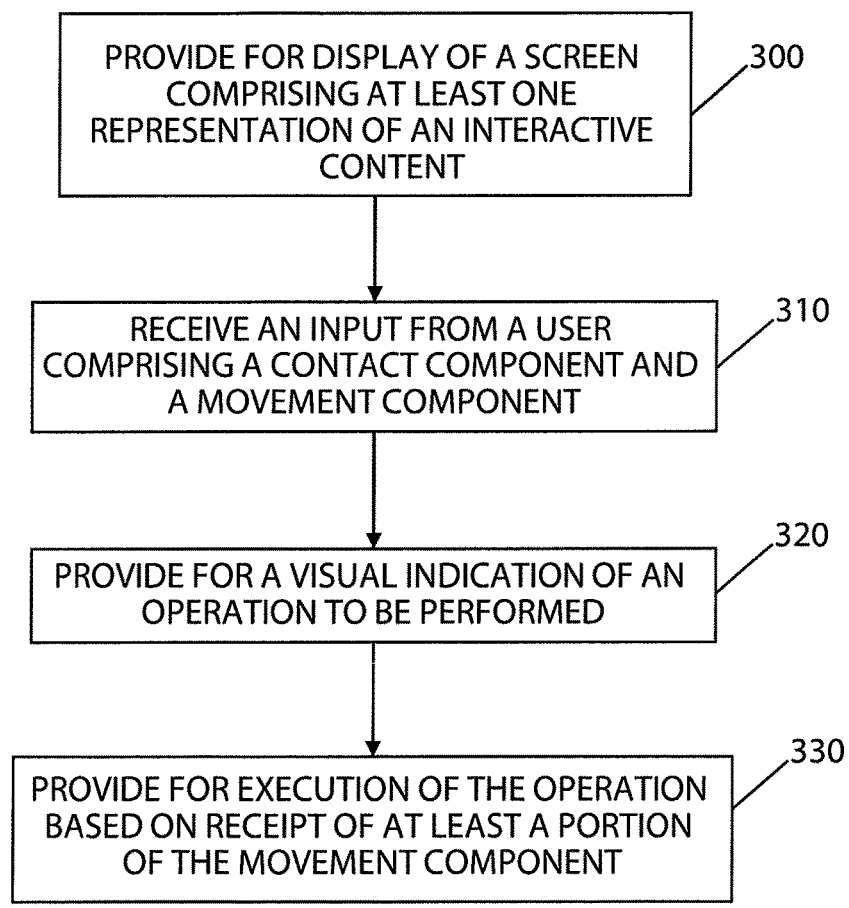
FIG. 7 illustrates a flowchart of a method of providing for a visual indication of an operation to be performed according to another example embodiment of the present invention.

FIG. 7 illustrates flowcharts of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for providing for a visual indication of an operation to be performed, as shown in FIG. 7, includes providing for display of a screen comprising at least one representation of an interactive content at Block 300, receiving an input from a user comprising a contact component and a movement component at Block 310, and providing for a visual indication of an operation to be performed at Block 320. The visual indication may be provided for in response to receipt of the contact component and prior to receive of the movement component, as described above, and the operation may be determined based on at least a position of the contact component. The method may further include providing for execution of the operation based on receipt of at least a portion of the movement component at Block 330.

In some cases, as described above, the visual indication may comprise a graphical effect applied to at least a portion of the screen proximate the position of the contact component. The graphical effect may simulate a physical response of the screen to the input based on at least the position of the contact component of the input. In some embodiments, the graphical effect may simulate a deflection of the screen away from a source of the input. In other embodiments, the graphical effect may simulate a deflection of a portion of the screen corresponding to the position of the contact component of the input away from a source of the input, as described above.

The screen may, in some embodiments, be a first screen, and the interactive content may be a first interactive content, such as a lock screen or a call log. The operation may comprise a visual transition from the first screen to a second screen comprising at least one representation of a second interactive content in response to the position of the contact component being an edge portion of the first screen. Alternatively, in other embodiments, the operation may comprise a translation of at least a portion of the interactive content proximate the position of the contact component, such as a panning operation that is applied to the screen or movement of a particular icon or other content element from one point to another on the screen. The translation may be proportional to the movement component of the input.

In some embodiments, certain ones of the operations above may be modified or further amplified as described below. Furthermore, in some embodiments, additional optional operations may be included. Modifications, additions, or amplifications to the operations above may be performed in any order and in any combination.

In an example embodiment, an apparatus for performing the methods of FIG. 7 above may comprise a processor (e.g., the processor 70 of FIG. 2) configured to perform some or each of the operations (300-330) described above. The processor may, for example, be configured to perform the operations (300-330) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 300, 320, and 330 may comprise, for example, the user interface transceiver 72, the communication interface 74, the processor 70, the memory device 76, and/or a device or circuit for executing instructions or executing an algorithm for processing information as described above. Examples of means for performing operation 310 may comprise, for example, the user interface transceiver 72, the processor 70, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:

provide for display of a first screen comprising at least one representation of first interactive content;

receive an input from a user comprising a contact component and a movement component;

provide for a visual indication, in response to receipt of the contact component and prior to receipt of the movement component, of an operation to be performed, wherein the operation is determined based on at least a position of the contact component and comprises a visual transition from the first screen to a second screen comprising at least one representation of a second interactive content; and provide for execution of the operation based on receipt of at least a portion of the movement component, wherein the visual indication comprises a graphical effect applied to at least a portion of the screen proximate the position of the contact component and reveals a portion of the second screen underlying the first screen.

2. The apparatus of claim 1, wherein the graphical effect simulates a physical response of the screen to the input based on at least the position of the contact component of the input.

3. The apparatus of claim 1, wherein the graphical effect simulates a deflection of the screen away from a source of the input.

4. The apparatus of claim 1, wherein the graphical effect simulates a deflection of a portion of the screen corresponding to the position of the contact component of the input away from a source of the input.

5. The apparatus of claim 1, wherein the operation comprises a visual transition from the first screen to the second screen in response to the position of the contact component being an edge portion of the first screen.

6. The apparatus of claim 1, wherein the operation comprises translation of at least a portion of the interactive content proximate the position of the contact component, wherein the translation is proportional to the movement component of the input.

7. A method comprising:
providing for display of a first screen comprising at least one representation of first interactive content;
receiving an input from a user comprising a contact component and a movement component;
providing for a visual indication, in response to receipt of the contact component and prior to receipt of the movement component, of an operation to be performed, wherein the operation is determined based on at least a position of the contact component and comprises a visual transition from the first screen to a second screen comprising at least one representation of a second interactive content; and
providing for execution of the operation based on receipt of at least a portion of the movement component,
wherein the visual indication comprises a graphical effect applied to at least a portion of the screen proximate the position of the contact component and reveals a portion of the second screen underlying the first screen.

8. The method of claim 7, wherein the graphical effect simulates a physical response of the screen to the input based on at least the position of the contact component of the input.

9. The method of claim 7, wherein the graphical effect simulates a deflection of the screen away from a source of the input.

10. The method of claim 7, wherein the graphical effect simulates a deflection of a portion of the screen corresponding to the position of the contact component of the input away from a source of the input.

11. The method of claim 7, wherein the operation comprises a visual transition from the first screen to the second screen in response to the position of the contact component being an edge portion of the first screen.

12. The method of claim 7, wherein the operation comprises translation of at least a portion of the interactive content proximate the position of the contact component, wherein the translation is proportional to the movement component of the input.

13. A computer program product comprising at least one non-transitory computer-readable storage medium having computer-executable program code portions stored therein, the computer-executable program code portions comprising program code instructions for:
providing for display of a first screen comprising at least one representation of first interactive content;
receiving an input from a user comprising a contact component and a movement component;
providing for a visual indication, in response to receipt of the contact component and prior to receipt of the movement component, of an operation to be performed, wherein the operation is determined based on at least a position of the contact component and comprises a visual transition from the first screen to a second screen comprising at least one representation of a second interactive content; and
providing for execution of the operation based on receipt of at least a portion of the movement component,
wherein the visual indication comprises a graphical effect applied to at least a portion of the screen proximate the position of the contact component and reveals a portion of the second screen underlying the first screen.

14. The computer program product of claim 13, wherein the graphical effect simulates a physical response of the screen to the input based on at least the position of the contact component of the input.

15. The computer program product of claim 13, wherein the graphical effect simulates a deflection of the screen away from a source of the input.

16. The computer program product of claim 13, wherein the graphical effect simulates a deflection of a portion of the screen corresponding to the position of the contact component of the input away from a source of the input.

17. The computer program product of claim 13, wherein the operation comprises a visual transition from the first screen to the second screen in response to the position of the contact component being an edge portion of the first screen.

18. The computer program product of claim 13, wherein the operation comprises translation of at least a portion of the interactive content proximate the position of the contact component, wherein the translation is proportional to the movement component of the input.

* * * * *